(12) United States Patent
Chan

(10) Patent No.: US 11,042,199 B2
(45) Date of Patent: Jun. 22, 2021

(54) PORTABLE ELECTRONIC DEVICE

(71) Applicant: PEGATRON CORPORATION, Taipei (TW)

(72) Inventor: Hung-Lu Chan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/882,612

(22) Filed: May 25, 2020

(65) Prior Publication Data

US 2020/0401186 A1 Dec. 24, 2020

(30) Foreign Application Priority Data

Jun. 19, 2019 (TW) .................................. 108207825

(51) Int. Cl.
*G06F 1/16* (2006.01)

(52) U.S. Cl.
CPC ............ *G06F 1/169* (2013.01); *G06F 1/1681* (2013.01); *G06F 2200/1632* (2013.01)

(58) Field of Classification Search
CPC .... G06F 1/1616; G06F 1/1618; G06F 1/1656; G06F 1/1679; G06F 1/1681; G06F 2200/1632
See application file for complete search history.

(56) References Cited

U.S. PATENT DOCUMENTS

| | | |
|---|---|---|
| 10,082,896 B1 | 9/2018 | Yang et al. |
| 2005/0090206 A1* | 4/2005 | Hyun ................ G06F 1/1688 455/90.3 |
| 2014/0253461 A1 | 9/2014 | Hicks et al. |
| 2017/0357290 A1* | 12/2017 | Noguchi .............. G06F 1/1616 |
| 2018/0107254 A1* | 4/2018 | Godfrey .............. G06F 1/1654 |
| 2019/0250673 A1* | 8/2019 | Chen .................. G06F 1/1654 |
| 2019/0346881 A1* | 11/2019 | Chai ................... G06F 1/1681 |
| 2020/0159293 A1* | 5/2020 | Seibert ............... G06F 1/1683 |
| 2020/0174529 A1* | 6/2020 | Goh .................... G06F 1/1643 |
| 2020/0174530 A1* | 6/2020 | Wu ..................... G06F 1/1616 |

FOREIGN PATENT DOCUMENTS

| | | |
|---|---|---|
| TW | M251171 U | 11/2004 |
| TW | 201835726 A | 10/2018 |

* cited by examiner

*Primary Examiner* — Anthony Q Edwards
(74) *Attorney, Agent, or Firm* — McClure, Qualey & Rodack, LLP

(57) ABSTRACT

A portable electronic device includes a cover, a hinge structure, a base, and a removable component. The base is pivotally connected to the cover through the hinge structure, and the base comprises an accommodating groove adjacent to the cover. The removable component is detachably disposed in the accommodating groove. When the removable component is disposed at a first position in the accommodating groove, the hinge structure locks a rotation of the cover relative to the base.

10 Claims, 8 Drawing Sheets

PORTABLE ELECTRONIC DEVICE

CROSS-REFERENCE TO RELATED APPLICATION

This application claims the priority benefit of Taiwan application serial no. 108207825, filed on Jun. 19, 2019. The entirety of the above-mentioned patent application is hereby incorporated by reference herein and made a part of this specification.

BACKGROUND

Technical Field

The present disclosure relates to an electronic device, and in particular, to a portable electronic device that operates according to a set position of a removable component.

Description of Related Art

A portable electronic device has become an indispensable part of modern people's life. Generally, the portable electronic device mainly includes a base and a cover. The base may be used for accommodating components such as a processor, a memory, and a battery, and the cover is used for accommodating components such as a camera and a display.

It is well known that a user may operate the portable electronic device when the portable electronic device is in an open state, and the user may carry the portable electronic device easily when the portable electronic device is in a closed state. However, conventional portable electronic device does not have a mechanism to lock the closed state, so that an unauthorized user may also operate the conventional portable electronic computer. Therefore, the privacy of the conventional portable electronic device needs to be improved.

SUMMARY

To resolve the foregoing problem, the present disclosure provides the following embodiments, and a specific function of an electronic device can be implemented by the operation of a removable component.

An embodiment of the present disclosure relates to a portable electronic device. The portable electronic device includes at least a cover, a hinge structure, a base, and a removable component. The base is pivotally connected to the cover through the hinge structure. The base includes an accommodating groove adjacent to the cover. The removable component is detachably disposed in the accommodating groove. When the removable component is disposed at a first position in the accommodating groove, the hinge structure locks a rotation of the cover relative to the base.

Therefore, according to the foregoing embodiment of the present disclosure, the present disclosure provides at least a portable electronic device, and a lock function of the portable electronic device can be implemented by the operation of the removable component.

DETAILED DESCRIPTION

The following clearly describes the spirit of the present disclosure with reference to the drawings and detailed descriptions. Any person of ordinary skill in the art may make alterations and modifications according to the technology shown in present disclosure after understanding the embodiments of the present disclosure, without departing from the spirit or scope of the present disclosure.

As used herein, the terms such as "first" and "second" do not specifically refer to an order or a sequence, nor are intended to limit the present disclosure, which are merely intended to distinguish components or operations described in the same technical terms.

As used herein, the terms "coupled", "connected", or "pivotally connected" may refer to that two or more components or devices are in direct or indirect contact with each other as a physical body, or that two or more components or devices are in operation or action with each other.

Figure 1:
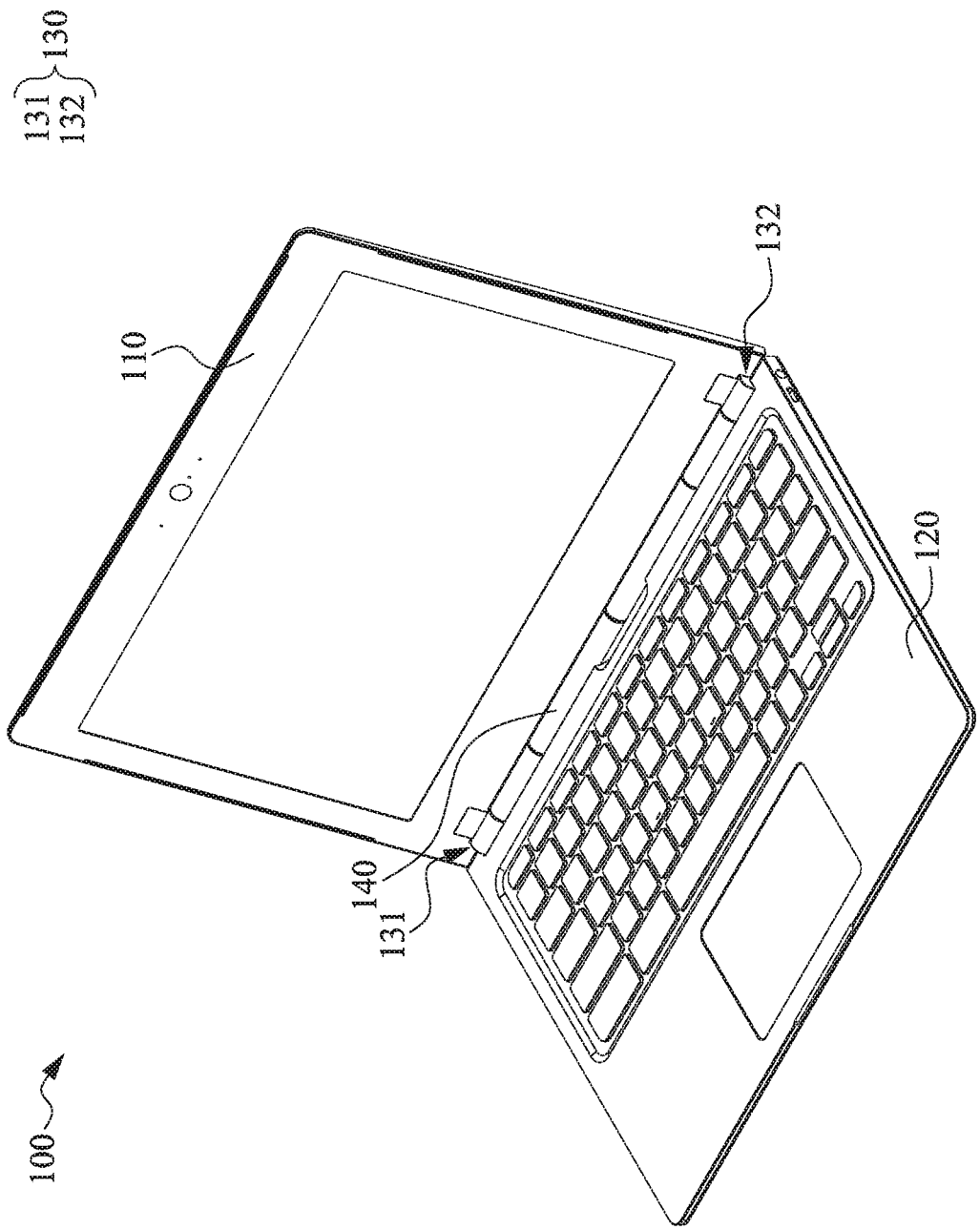
FIG. 1 is a schematic diagram of a portable electronic device according to some embodiments of the present disclosure.

FIG. 1 is a schematic diagram of a portable electronic device according to some embodiments of the present disclosure, where the portable electronic device 100 is in an open state. As shown in FIG. 1, in some embodiments, the portable electronic device 100 includes at least a cover 110 and a base 120, and the cover 110 is pivotally connected to the base 120 through a hinge structure 130. In some embodiments, the base 120 may be used for accommodating components such as a processor, a memory, and a battery of the portable electronic device 100, and the cover 110 may be used for accommodating components such as a camera and a display, but the present disclosure is not limited thereto.

As shown in FIG. 1, the hinge structure 130 includes a first end 131, pivotally connected to an upper left corner of the base 120 and a left bottom end of the cover 110. The hinge structure 130 further includes a second end 132, pivotally connected to an upper right corner of the base 120 and a right bottom end of the cover 110. It should be understood that both the first end 131 and the second end 132 of the hinge structure 130 may be rotated to a particular angle, so that the cover 110 rotates relative to the base 120.

As shown in FIG. 1, in some embodiments, the portable electronic device 100 further includes a removable component 140. In an embodiment of FIG. 1, the removable component 140 is in a folded state. In the folded state, the removable component 140 is disposed on the base 120 of the portable electronic device 100. In this way, the removable component 140 is disposed between the first end 131 and the second end 132 of the hinge structure 130. In some embodiments, the removable component 140 has a cylindrical appearance and is operable to implement the functions of a stylus.

Figure 2:
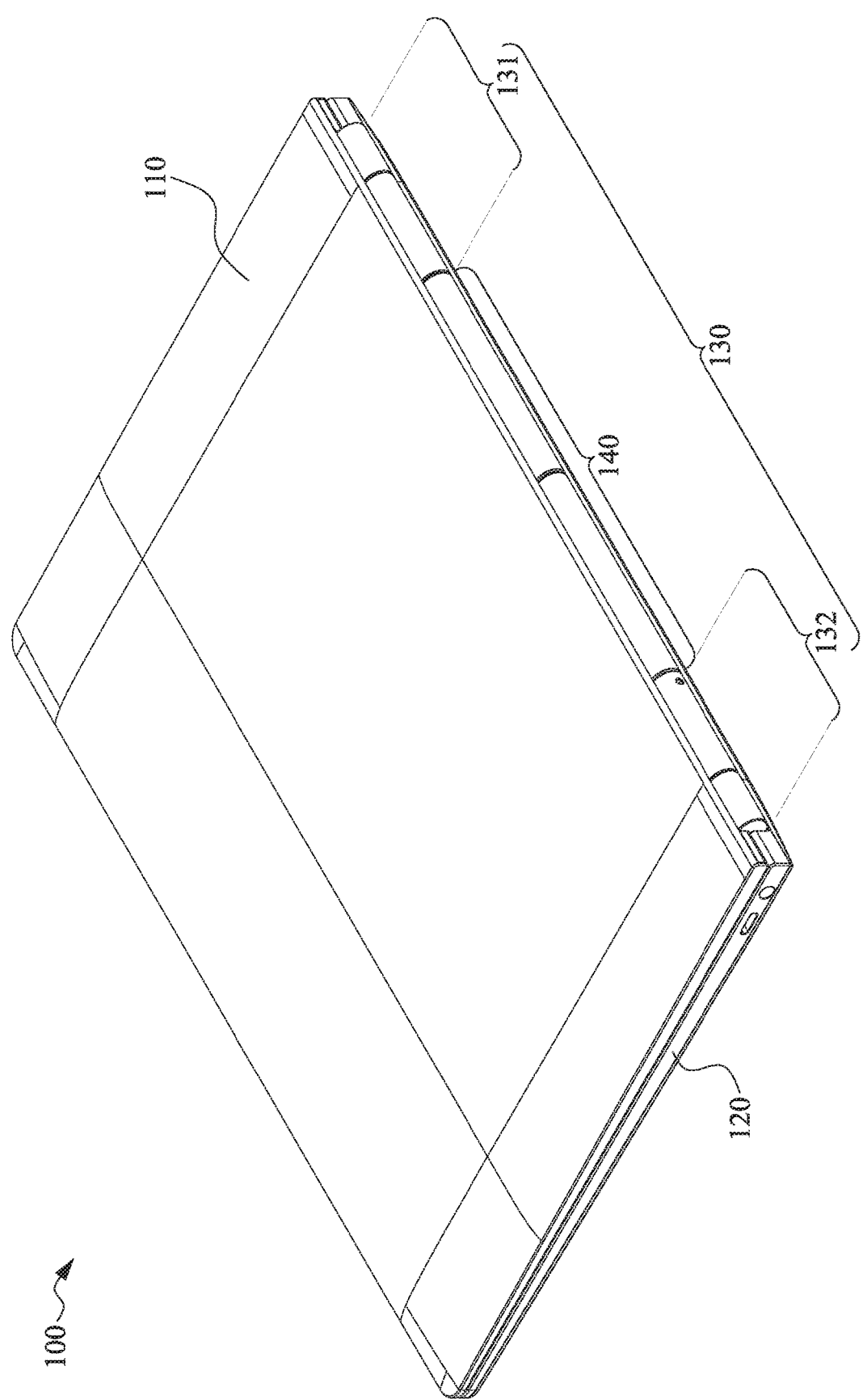
FIG. 2 is a schematic diagram of the portable electronic device according to some embodiments of the present disclosure.

FIG. 2 is a schematic diagram of the portable electronic device according to some embodiments of the present disclosure, where the portable electronic device 100 is in a closed state. As shown in FIG. 2, in the closed state, the cover 110 of the portable electronic device 100 may be attached to the base 120 to facilitate carrying. As shown in the view of FIG. 2, under correct setting, the removable component 140 is located between the first end 131 and the second end 132 of the hinge structure 130.

Figure 3:
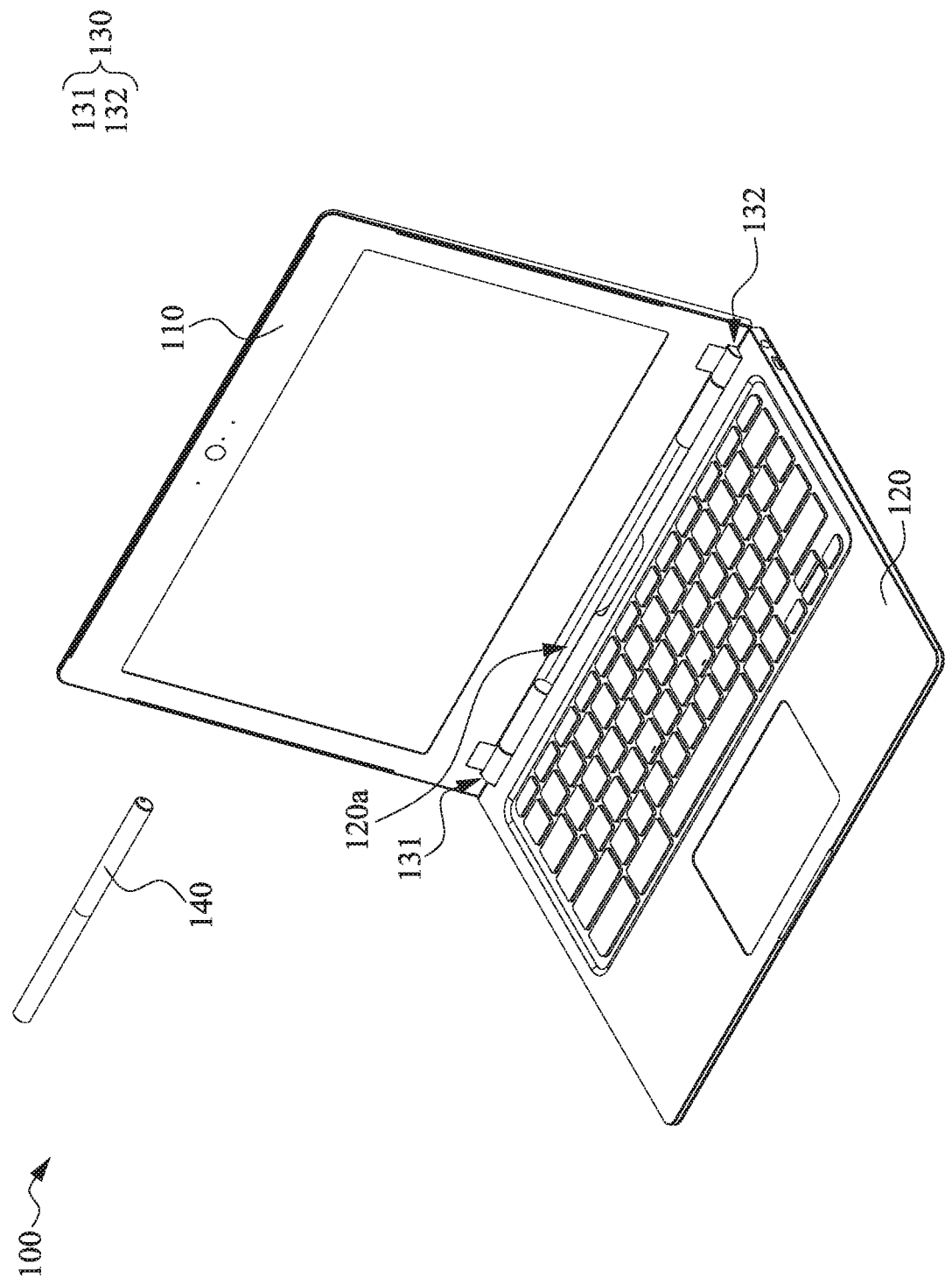
FIG. 3 is a schematic diagram of the portable electronic device according to some embodiments of the present disclosure.

FIG. 3 is a schematic diagram of the portable electronic device according to some embodiments of the present disclosure. In an embodiment of FIG. 3, the removable component 140 is in a detached state. In the detached state, the removable component 140 may be removed from an accommodating groove 120a of the base 120.

It should be understood that the accommodating groove 120a is approximately cylindrical. A size and/or length of the removable component 140 approximately corresponds to a size and/or length of the accommodating groove 120a, so that both ends of the removable component 140 may be attached to (or close to) two sidewalls of the accommodating groove 120a, except that the removable component 140 may rotate in the accommodating groove 120a along its central axis. In addition, in some embodiments, a particular shaped hole may be dug beside the accommodating groove 120a of the base 120, to facilitate a user's fingers to reach in to remove the removable component 140.

Figure 4:
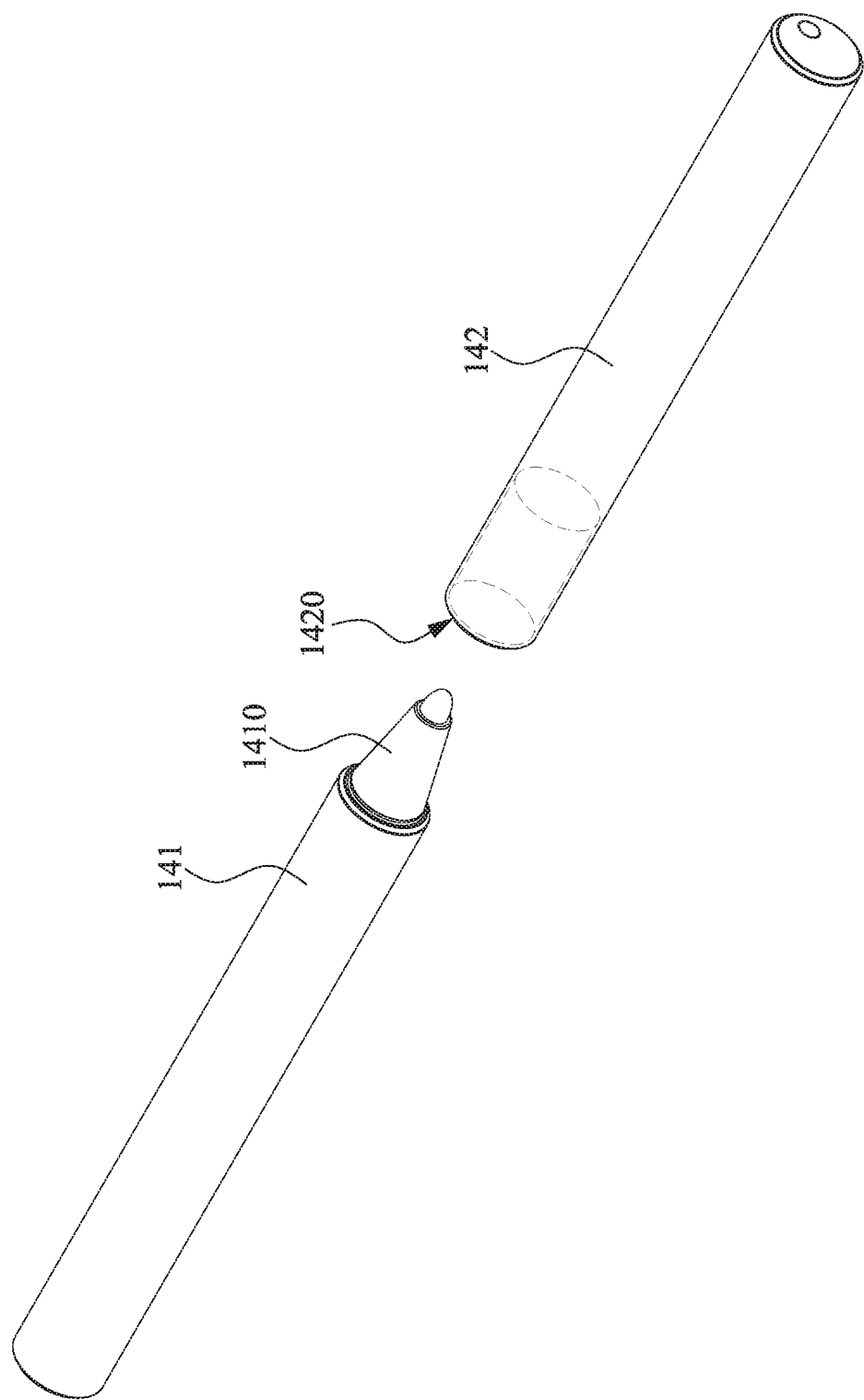
FIG. 4 is a schematic diagram of a removable component according to some embodiments of the present disclosure.

FIG. 4 is a schematic diagram of the removable component according to some embodiments of the present disclosure. As shown in FIG. 4, in some embodiments, the removable component 140 includes a first portion 141 and a second portion 142 that are separable. The first portion 141 may include a pen tip 1410, and the second portion 142 may include a pen cap 1420 used for accommodating the pen tip 1410. It should be understood that a size and/or depth of the pen cap 1420 is at least enough to accommodate the pen tip 1410. When the pen tip 1410 is correctly disposed in the pen cap 1420, the first portion 141 and the second portion 142 may be combined into a flat and smooth appearance, so that the removable component 140 may be accommodated in the accommodating groove 120a shown in FIG. 3.

In some embodiments, the first portion 141 of the removable component 140 may be a stylus. In some embodiments, the second portion 142 of the removable component 140 may be connected to the other end of the first portion 141 far from the pen tip 1410, so that the first portion 141 and the second portion 142 of the removable component 140 may be combined into another appearance for use as a longer stylus.

Figure 5:
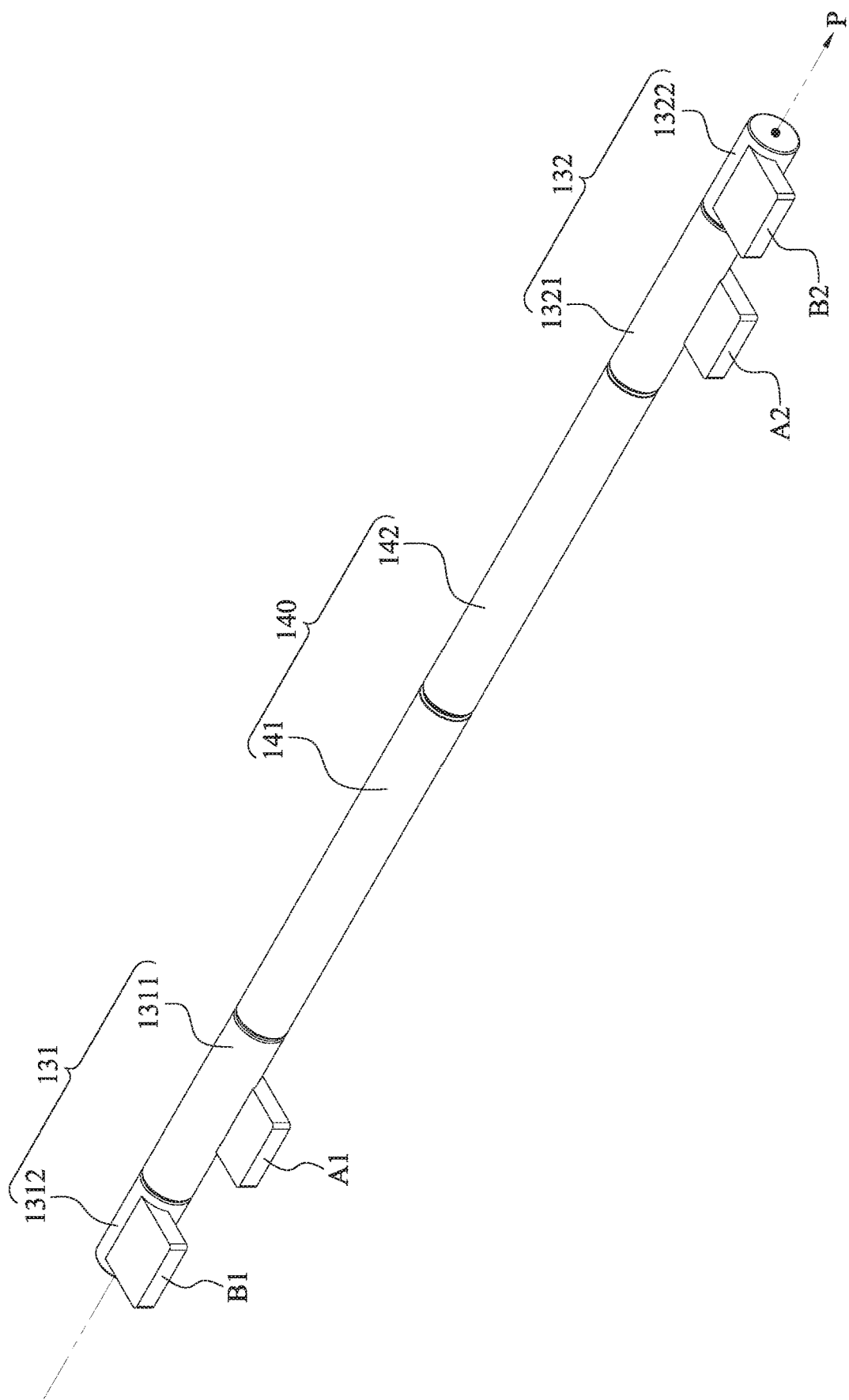
FIG. 5 is a partial schematic diagram of the portable electronic device according to some embodiments of the present disclosure.

FIG. 5 is a partial schematic diagram of the portable electronic device according to some embodiments of the present disclosure. It should be noted that, to better describe the operating state of some mechanisms and components in the portable electronic device 100, FIG. 5 only shows the removable component 140 and the hinge structure 130 of the portable electronic device 100, and remaining portions are omitted.

As shown in FIG. 5, the removable component 140 includes a first portion 141 and a second portion 142, and the hinge structure 130 includes a first end 131 and a second end 132. To understand a relative relationship between the components shown in FIG. 5 and other components of the portable electronic device 100, please refer to FIG. 1 to FIG. 3. It should be understood that when the removable component 140 is disposed in the accommodating groove 120a of the base 120 (as shown in FIG. 1), a relative position of the removable component 140 and the hinge structure 130, that is, as shown in FIG. 5, is approximately that, the first portion 141 and the second portion 142 of the removable component 140 are attached to the first end 131 and the second end 132 of the hinge structure 130 respectively. Therefore, the removable component 140 rotates along the same axial direction P as the hinge structure 130.

As shown in FIG. 5, the first end 131 of the hinge structure 130 includes a base end 1311 and a cover end 1312 pivotally connected to each other, and the second end 132 of the hinge structure 130 includes a base end 1321 and a cover end 1322 pivotally connected to each other. By this setting, the cover end 1312 of the first end 131 may rotate relative to the base end 1311 along an axial direction P, and the cover end 1322 of the second end 132 may rotate relative to the base end 1321 along the same axial direction P.

It should be noted that a bump AI of the base end 1311 and a bump A2 of the base end 1321 are fixedly connected to the base 120 shown in FIG. 1, while a bump BI of the cover end 1312 and a bump B2 of the cover end 1322 are fixedly connected to the cover 110 shown in FIG. 1. By this setting, the base end 1311 and the base end 1321 rotate relative to the cover end 1312 and the cover end 1322 along the axial direction P to drive the bump AI and the bump A2 rotate relative to the bump BI and the bump B2, so that the cover 110 rotates relative to the base 120.

Figure 6:
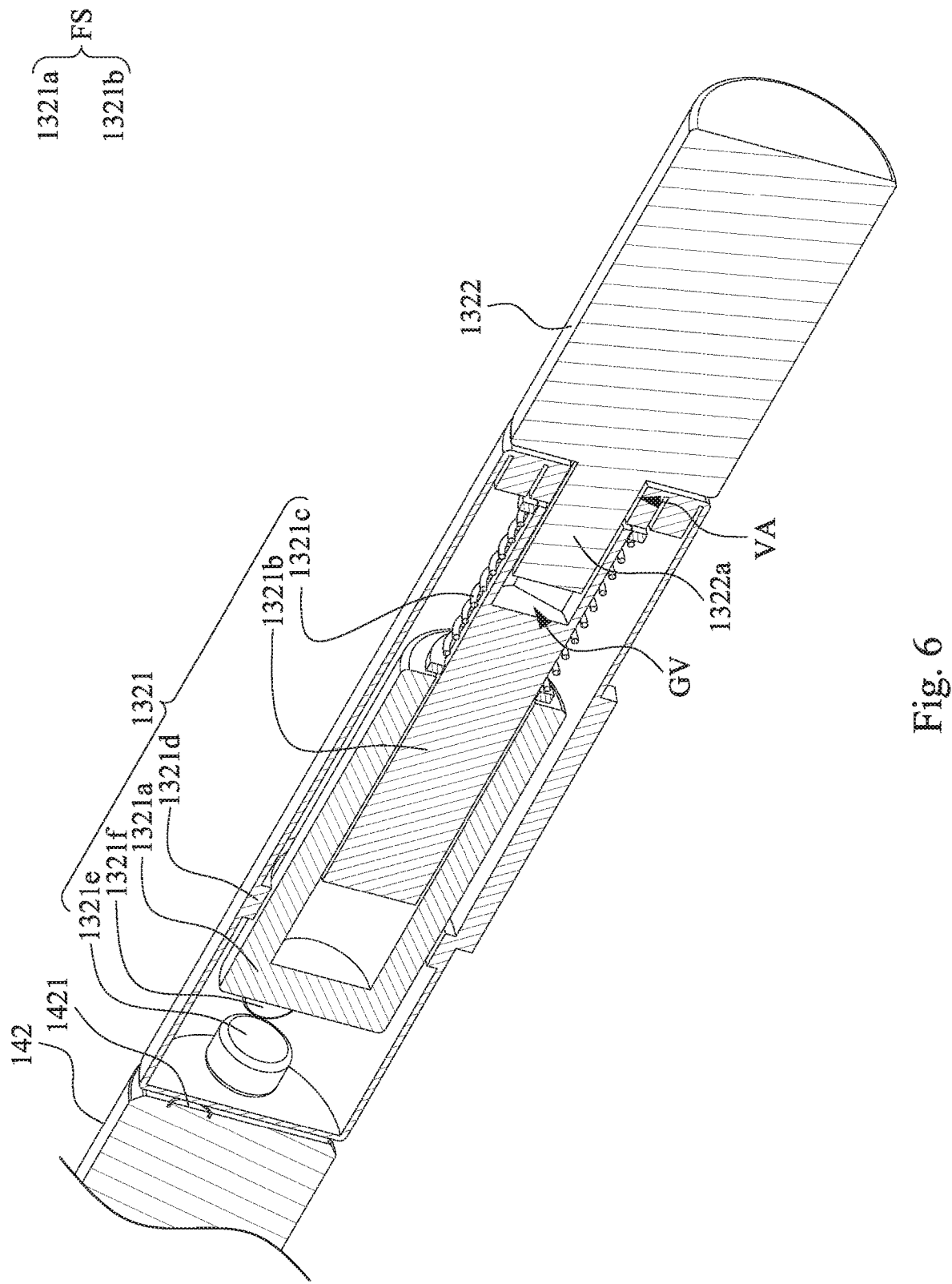
FIG. 6 is a schematic cross-sectional view of the portable electronic device according to some embodiments of the present disclosure.

FIG. 6 is a schematic cross-sectional view of the portable electronic device according to some embodiments of the present disclosure. For ease of description, FIG. 6 only shows the second end 132 of the hinge structure 130 and a part of the removable component 140 in FIG. 5. It should be noted that in the state shown in FIG. 6, the removable component 140 is located in the accommodating groove 120a shown in FIG. 3 and rotated to a first angle. In this case, the removable component 140 is referred to be at a first position in the accommodating groove 120a.

As shown in FIG. 6, the hinge structure 130 includes a convex portion 1322a and a buckle mechanism FS. The convex portion 1322a is located at the cover end 1322 and penetrates into a housing of the base end 1321 through a slot VA. The buckle mechanism FS is located at the base end 1321, and the buckle mechanism FS is movably sleeved on the convex portion 1322a. In detail, the buckle mechanism FS includes a sleeve 1321a and a movable shaft 1321b, The sleeve 1321a is fixed to the housing of the base end 1321, the movable shaft 1321b is disposed in the sleeve 1321a, and the movable shaft 1321b may slide in the sleeve 1321a. In some embodiments, the hinge structure 130 further includes a spring 1321c, an electromagnetic valve 1321d, a magnetic component 1321e, and a light-emitting component 1321f. The spring 1321c is disposed between the housing and the sleeve 1321a to limit sliding of the movable shaft 1321b relative to the sleeve 1321a.

As shown in FIG. 6, a magnetic component 1421 is disposed within a tail end (or on a tail end) of the second portion 142 of the removable component 140. It should be noted that the tail end of the second portion 142 of the removable component 140 has a round appearance when viewed from the side, and the magnetic component 1421 is disposed towards a particular position within the circle. That is, the magnetic component 1421 is not disposed on the central axis of the removable component 140.

As described above, in the state shown in FIG. 6, the removable component 140 is at the first position in the accommodating groove 120a shown in FIG. 3. At this first position, the magnetic component 1421 of the removable component 140 and a magnetic component 1321e of the base end 1321 are misaligned with each other, so that the magnetic component 1421 and the magnetic component 1321e cannot interact to generate an electric signal. In this case, the electromagnetic valve 1321d does not move, and a resilience of the spring 1321c limits the movable shaft 1321b to the position shown in FIG. 6. In this case, the movable shaft 1321b is sleeved on the convex portion 1322a, so that a groove GV of the movable shaft 1321b is embedded with the convex portion 1322a, thereby locking the convex portion 1322a. Therefore, when the removable component 140 is at the first position in the accommodating groove 120a, the base end 1321 cannot rotate relative to the cover end 1322, so that the cover 110 is fixed to the base 120.

Figure 7:
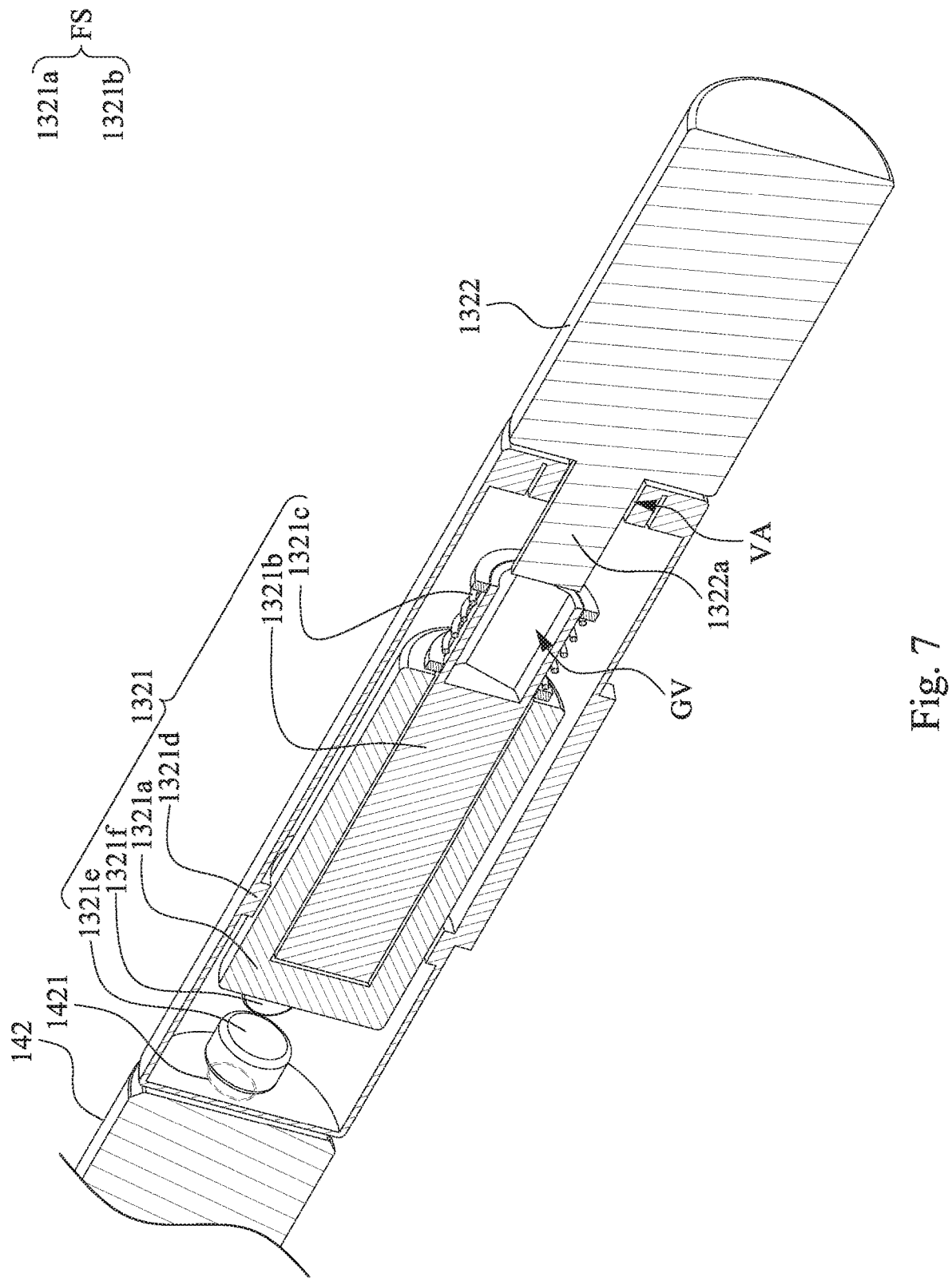
FIG. 7 is a schematic cross-sectional view of the portable electronic device according to some embodiments of the present disclosure.

FIG. 7 is a schematic cross-sectional view of the portable electronic device according to some embodiments of the present disclosure. Similar to FIG. 6, FIG. 7 only shows the second end 132 of the hinge structure 130 and a part of the removable component 140 in FIG. 6. However, the state shown in FIG. 7 is different from the state shown in FIG. 6. In the state shown in FIG. 7, the removable component 140 is located in the accommodating groove 120a shown in FIG. 3 and rotated to a second angle. In this case, the removable component 140 is referred to be at a second position in the accommodating groove 120a.

It should be noted that when the removable component 140 is at the second position in the accommodating groove 120a, the magnetic component 1421 of the removable component 140 may be aligned with the magnetic component 1321e of the base end 1321, so that the magnetic component 1421 and the magnetic component 1321e may interact to generate an electric signal. In this case, a battery in the portable electronic device 100 supplies power, and the electromagnetic valve 1321d is driven, so that the electromagnetic valve 1321d is moved to attach the movable shaft 1321b in the buckle mechanism FS.

Compared to the state in FIG. 6, the movable shaft 1321b is retracted into the sleeve 1321a, so that the convex portion 1322a is retracted from the groove GV of the movable shaft 1321b, thereby unlocking the convex portion 1322a. Therefore, when the removable component 140 is at the second position in the accommodating groove 120a, the movable shaft 1321b is far from the convex portion 1322a, so that the cover 110 can rotate relative to the base 120.

In some embodiments, when the electromagnetic valve 1321d is driven, the battery in the portable electronic device 100 may supply power to control the light-emitting component 1321f to emit light, thereby reminding a user that a rotation of the cover 110 relative to the base 120 has been unlocked. In contrast, in FIG. 6, when the electromagnetic valve 1321d is not driven, the light-emitting component 1321f does not emit light, thereby reminding the user that the rotation of the cover 110 relative to the base 120 is locked.

Figure 8:
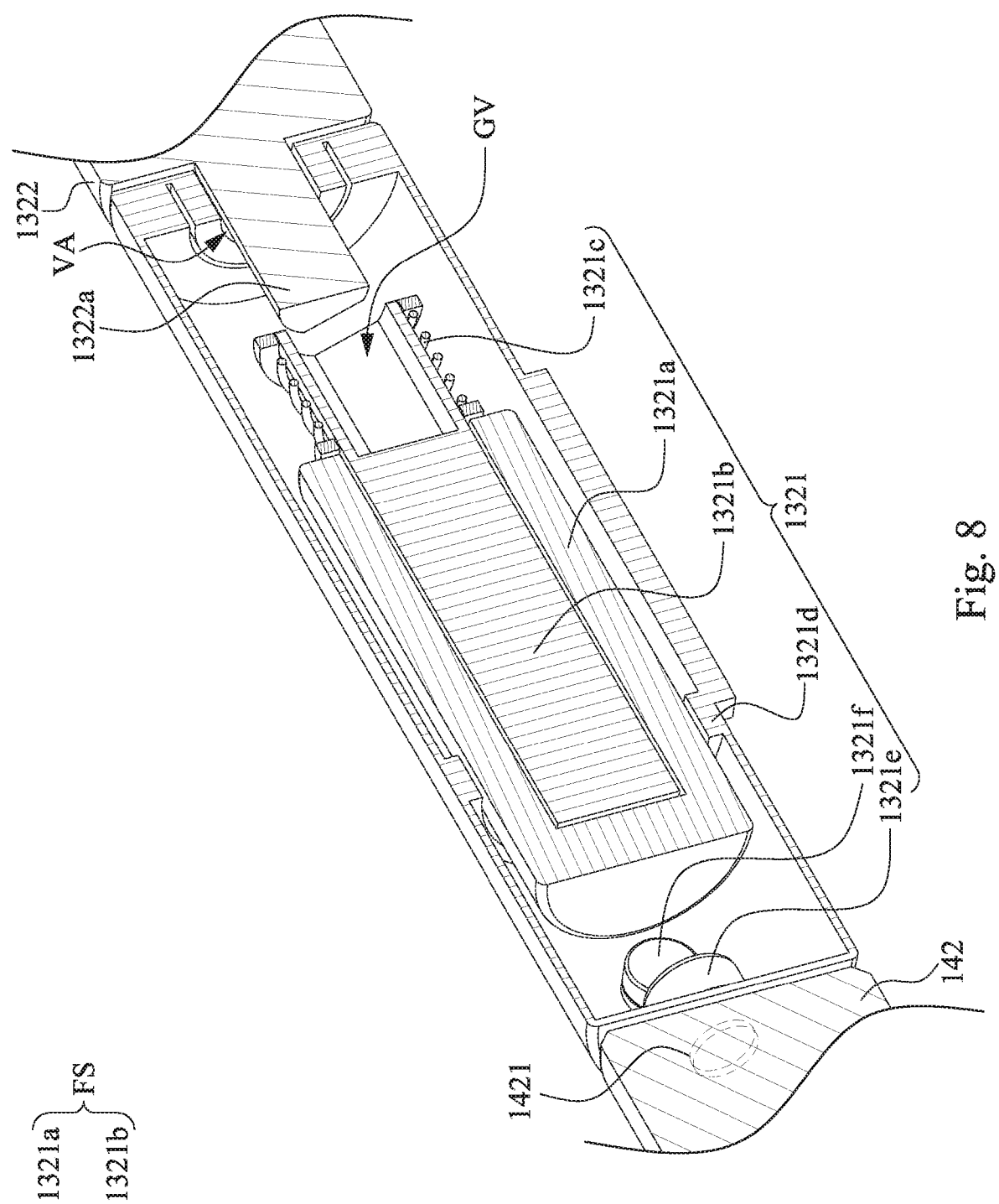
FIG. 8 is a schematic cross-sectional view of the portable electronic device according to some embodiments of the present disclosure.

FIG. 8 is a schematic cross-sectional view of the portable electronic device according to some embodiments of the present disclosure. It should be understood that FIG. 8 shows the second end 132 of the hinge structure 130 and a part of the removable component 140 in FIG. 7 from another view.

Compared to the state in FIG. 6, the movable shaft 1321b is retracted into the sleeve 1321a, so that the movable shaft 1321b is retracted from the convex portion 1322a, thereby unlocking the convex portion 1322a. It should be noted that, from this view, an accommodating space of the groove GV in the movable shaft 1321b has a specific shape, and an appearance of the convex portion 1322a also has a corresponding specific shape. By this setting, only when the portable electronic device 100 is in the closed state and the removable component 140 is at the first position in the accommodating groove 120a, the first angle enables that the convex portion 1322a is embedded in the groove GV of the movable shaft 1321b.

As shown in FIG. 8, when the removable component 140 is at the second position in the accommodating groove 120a, the convex portion 1322a is unlocked. The user can lift the cover 110 of the portable electronic device 100 to enable the cover 110 to rotate relative to the base 120, so that the portable electronic device 100 is in the open state. Correspondingly, the convex portion 1322a of the cover end 1322 also rotates according to the angle by which the cover 110 is lifted.

As described above, when the portable electronic device 100 is in the open state, the user can remove the removable component 140 from the accommodating groove 120a for use. In this case, the magnetic component 1421 and the magnetic component 1321e cannot interact, so that the electromagnetic valve 1321d cannot move, and the resilience of the spring 1321c enables the movable shaft 1321b to move to the position shown in FIG. 6. However, because the convex portion 1322a has been rotated, the movable shaft 1321b is limited by the specific shape of the convex portion 1322a and cannot be reset, and is movably attached to the convex portion 1322a. In this state, the base end 1321 may still rotate relative to the cover end 1322.

In addition, although FIG. 6 to FIG. 8 of the present disclosure only show the second end 132 of the hinge structure 130 and a part of the removable component 140 in FIG. 5, the present disclosure is not limited thereto. In some embodiments, the first end 131 of the hinge structure 130 and the other end of the removable component 140 may also be provided with a same or similar structure, so that the hinge structure 130 may lock/unlock the rotation of the cover 110 relative to the base 120.

According to the embodiments of FIG. 1 to FIG. 8, it may be learned that if the user intends to operate the portable electronic device 100, the user can rotate the removable component 140 from the rear of the portable electronic device 100 when the portable electronic device 100 in the closed state (as shown in FIG. 2), so that the removable component 140 is at the second position in the accommodating groove 120a. Therefore, the movable shaft 1321b is retracted into the sleeve 1321a, so that the base end 1321 connected to the convex portion 1322a can rotate relative to the cover end 1322, allowing the portable electronic device 100 to enter the open state. In the open state, the user can remove the removable component 140 for use.

Similarly, according to the embodiments of FIG. 1 to FIG. 8, it may be learned that when the user intends to end the operation of the portable electronic device 100, the user can correctly dispose the removable component 140 into the accommodating groove 120a and operate the portable electronic device 100 into the closed state. The user can rotate the removable component 140 from the rear of the portable electronic device 100, so that the removable component 140 is at the first position in the accommodating groove 120a. In this case, the movable shaft 1321b is embedded with the convex portion 1322a, so that the rotation of the cover 110 relative to the base 120 is locked, and other people cannot directly operate the portable electronic device 100 into the open state.

It should be understood that the mechanisms shown in FIG. 5 to FIG. 8 of the present disclosure are merely an example, and are not intended to limit the present disclosure. An objective of the present disclosure is to enable that the removable component 140 (for example, the stylus) serves as a locking/unlocking device of the portable electronic device 100 for locking/unlocking the rotation of the cover 110 relative to the base 120. This mechanism can prevent a person who is unfamiliar with the portable electronic device 100 from easily removing the removable component 140 in the closed state.

Although the present disclosure has been disclosed above through the embodiments, the embodiments are not intended to limit the present disclosure. A person skilled in the art can make various changes and modifications without departing from the spirit and scope of the present disclosure. Therefore, the protection scope of the present disclosure shall be subject to the appended claims.

What is claimed is:

1. A portable electronic device, comprising:
    a cover;
    a hinge structure;
    a base, pivotally connected to the cover through the hinge structure, and comprising an accommodating groove adjacent to the cover; and
    a removable component, detachably disposed in the accommodating groove, wherein when the removable component is disposed at a first position in the accommodating groove, the hinge structure locks a rotation of the cover relative to the base.

2. The portable electronic device according to claim 1, wherein when the removable component is disposed at a second position in the accommodating groove, the hinge structure unlocks the rotation of the cover relative to the base.

3. The portable electronic device according to claim 2, wherein the hinge structure comprises:
    a convex portion, connected to the cover; and
    a buckle mechanism, connected to the base and movably sleeved on the convex portion, wherein
    when the removable component is disposed at the first position in the accommodating groove, the buckle mechanism is sleeved on the convex portion, so that the cover is fixed to the base, and
    when the removable component is disposed at the second position in the accommodating groove, the buckle mechanism is far from the convex portion, so that the cover rotates relative to the base.

4. The portable electronic device according to claim 3, wherein the buckle mechanism further comprises a groove, and a shape of an accommodating space of the groove is the same as a shape of the convex portion, so that the groove and the convex portion are embedded with each other when the buckle mechanism is sleeved on the convex portion.

5. The portable electronic device according to claim 2, wherein the accommodating groove comprises a first magnetic component and the removable component comprises a second magnetic component, wherein when the removable component is disposed at the second position in the accommodating groove, the first magnetic component and the second magnetic component interact to generate a signal, and the signal drives the hinge structure to unlock the rotation of the cover relative to the base.

6. The portable electronic device according to claim 1, wherein the removable component is a stylus.

7. The portable electronic device according to claim 6, wherein the stylus comprises a first portion and a second portion, the first portion and the second portion are separable, the first portion comprises a pen tip, and the second portion comprises a pen cap used for accommodating the pen tip.

8. The portable electronic device according to claim 1, wherein the hinge structure comprises a first end and a second end disposed on the base in parallel, and the accommodating groove is disposed between the first end and the second end.

9. The portable electronic device according to claim 1, wherein the removable component rotates from the first position to the second position in the accommodating groove along an axial direction.

10. The portable electronic device according to claim 9, wherein the hinge structure rotates along the axial direction.

* * * * *